Feb. 4, 1958  E. A. RICHARDS ET AL  2,821,992
FUEL SYSTEM FOR GAS TURBINE
Filed April 19, 1947  4 Sheets-Sheet 2

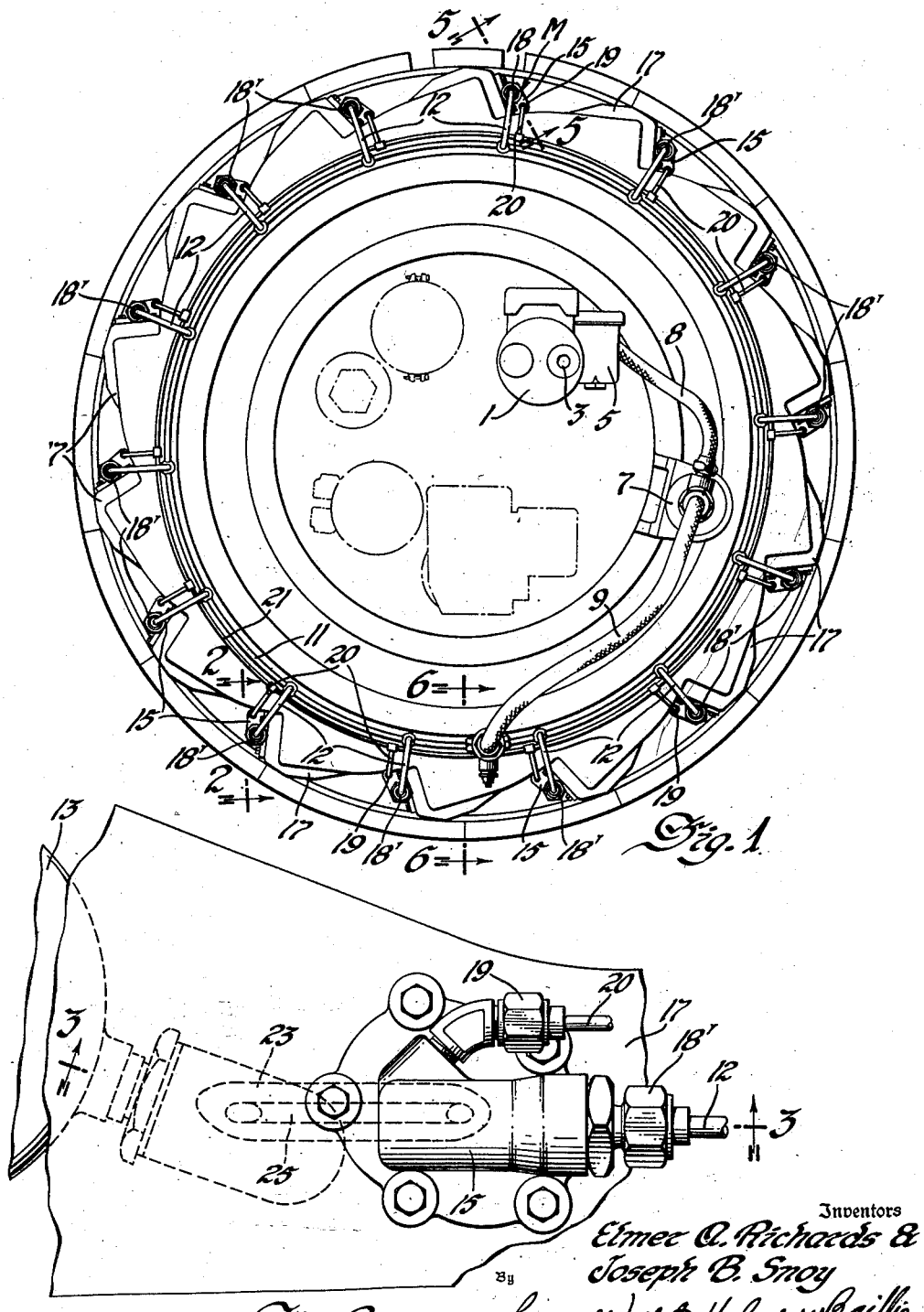

Inventors
Elmer A. Richards &
Joseph B. Snoy
By
Spencer, Willits, Helwig & Baillio
Attorneys

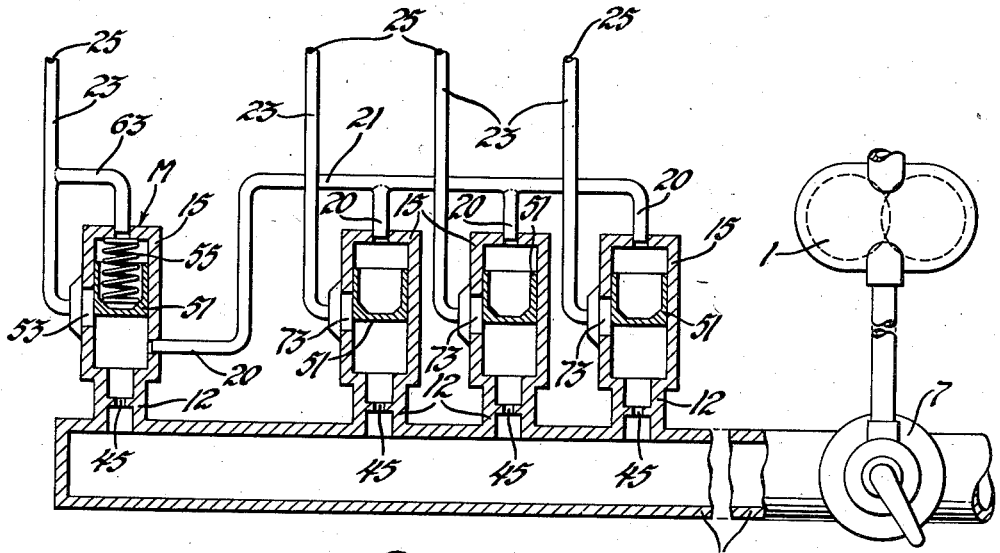
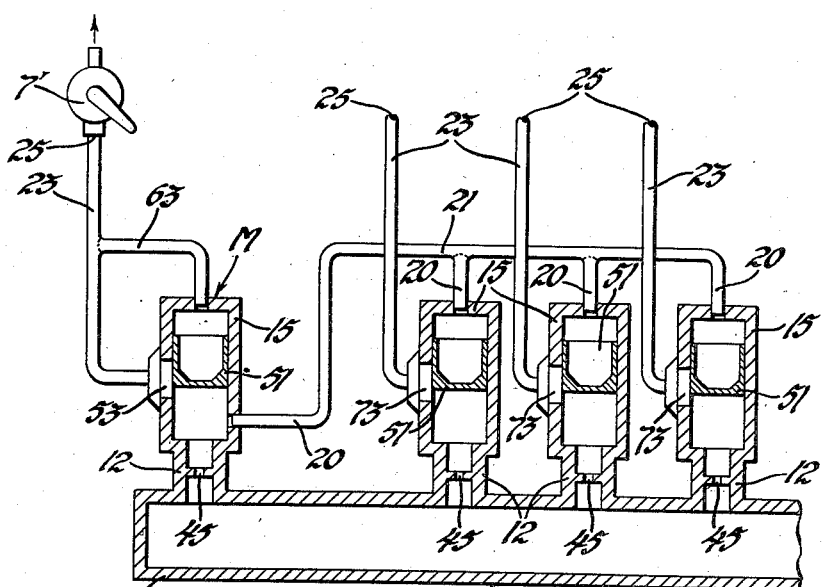

United States Patent Office 2,821,992
Patented Feb. 4, 1958

2,821,992

FUEL SYSTEM FOR GAS TURBINE

Elmer A. Richards and Joseph B. Snoy, Indianapolis, Ind., assignors to General Motors Corporation, Detroit, Mich., a corporation of Delaware Application April 19, 1947, Serial No. 742,756

19 Claims. (Cl. 137—118)

This invention relates to means for equalizing flow of fluid through each of a plurality of outlets from a common source of fluid pressure.

The principal object of the invention is the provision of pressure actuated means associated with separate outlets from a plurality of matched area orifices supplied from a common source of fluid pressure to equalize the flow through the outlets.

Another object being the provision of means for controlling the pressure actuated means for varying the flow equally through each of the outlets from the matched area orifices.

Another object being the provision of pressure connections between the separate outlets from the matched area orifices and the pressure actuated means to compensate for difference in head pressures on the respective orifices.

These and other objects will become apparent by reference to the following detailed description and drawings illustrating modifications of the invention which are particularly adapted for equalizing flow of fuel to a plurality of fuel outlets for the respective combustion chambers of a gas turbine jet propulsion unit.

Figure 1 of the drawings is a vertical elevational view of the flow equalization means and the fluid connections therebetween.

Figure 2 is an enlarged view taken on line 2—2 of Figure 1 with parts broken away.

Figure 7 is a schematic view of the flow equalizing means and connections shown in Figures 1 to 6.

Figure 8 is a view similar to Figure 7 showing minor modifications.

Figure 3:
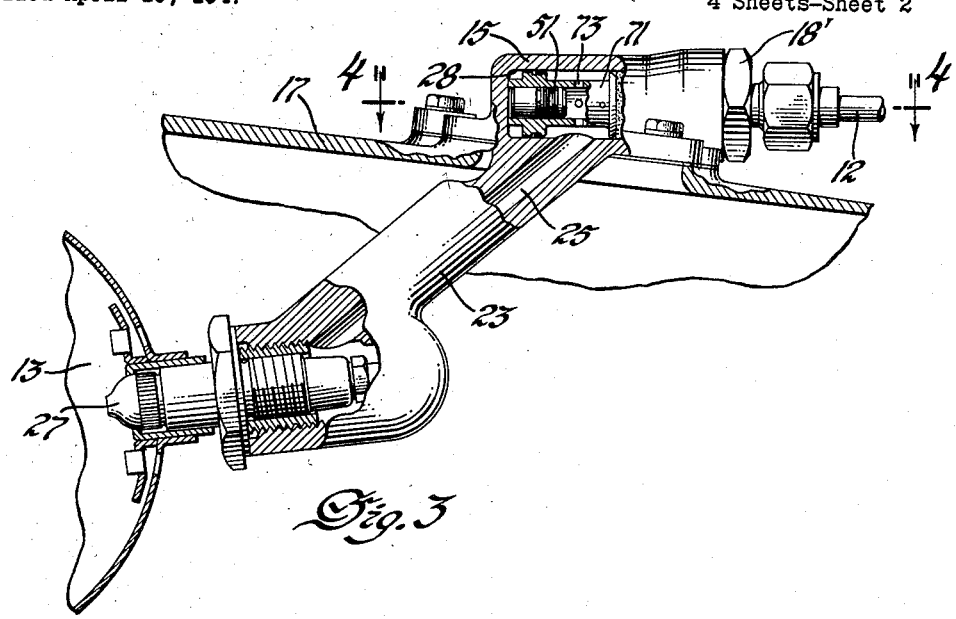
Figure 3 is a view taken on line 3—3 of Figure 2 with parts in section and broken away.
Figure 6:
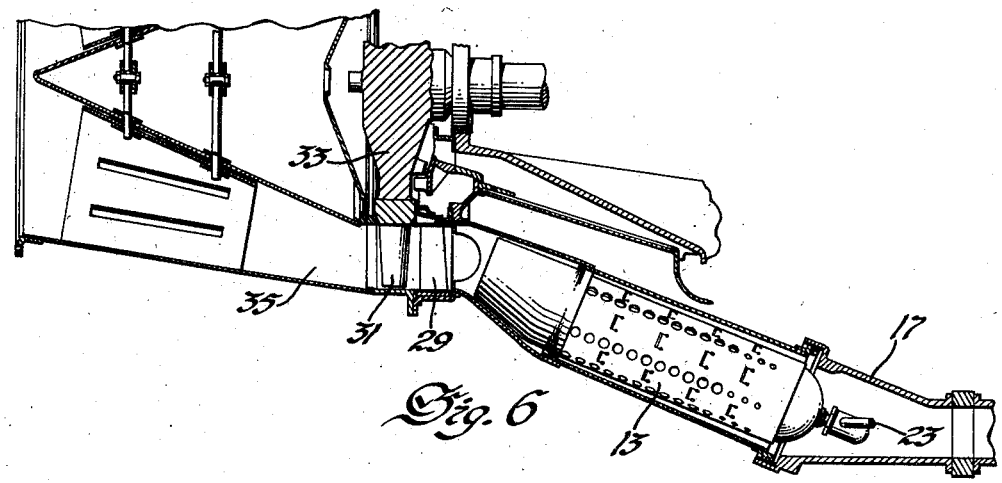
Figure 6 is a partial sectional view with parts broken away taken on line 6—6 of Figure 1.

As best illustrated in Figure 1 the fluid flow equalization system is for the purpose of insuring equal flow of liquid to multiple combustion chambers to be described and arranged in a circle for a gas turbine jet propulsion power plant. A fuel pump 1 driven by the turbine and having a fuel inlet connection 3 supplies fuel under pressure through a filter 5 to a manually operated throttle valve 7 connected by pipe connections 8 and 9 between the filter 5 and a circular fuel pressure supply manifold 11 having a plurality of radially extending outlet pipes 12 for supplying fuel to separate combustion chambers 13, as best illustrated in Figures 2, 3 and 6. In order to supply equal quantities of fuel to each of the combustion chambers 13 a plurality of differential pressure responsive fuel flow equalization valves are provided having identical housings 15 secured to separate air nozzles 17 supplied from a turbine driven compressor, not shown.

Each of the valve housings 15 is provided with a fuel inlet connection 18 or 18' connected to a separate outlet pipe 12 leading from the fuel manifold 11, and by pipe connections 19 through separate branch pipes 20 connected to a circular equalizing manifold 21 concentric with the fuel pressure manifold 11. Each valve housing 15 is provided with a fuel discharge nozzle support portion 23 shown in Figures 2, 3 and 6 extending through a side opening in an air nozzle 17. Each nozzle support portion 23 has a discharge passage 25 to a nozzle spray tip 27 leading from the valve housing bore 28 for spraying fuel in the center of the combustion chamber 13 secured to the discharge side of the air nozzle 17. The combustion chamber is provided with a spark plug, not shown, for igniting the air fuel mixture and the hot gases of combustion are directed through a gas nozzle 29 at the outlet of the combustion chamber on to the blades 31 of a turbine wheel 33 which drives the fuel pump 1 and the compressor, not shown, which furnishes air under pressure to the air nozzles 17. The exhaust gas from the turbine blades 31 are directed through a jet 35 secured to the combustion chambers to atmosphere to provide the propulsive thrust in conventional manner.

The valve housing 15 connected to the uppermost fuel manifold outlet pipe 12 in Figure 1 is provided with means to serve as a master fuel flow equalizing valve and is generally indicated by the character reference M. The other valve housings 15 are provided with means to serve as slave equalizing valves acting in response to the action of the master valve M.

Figure 5:
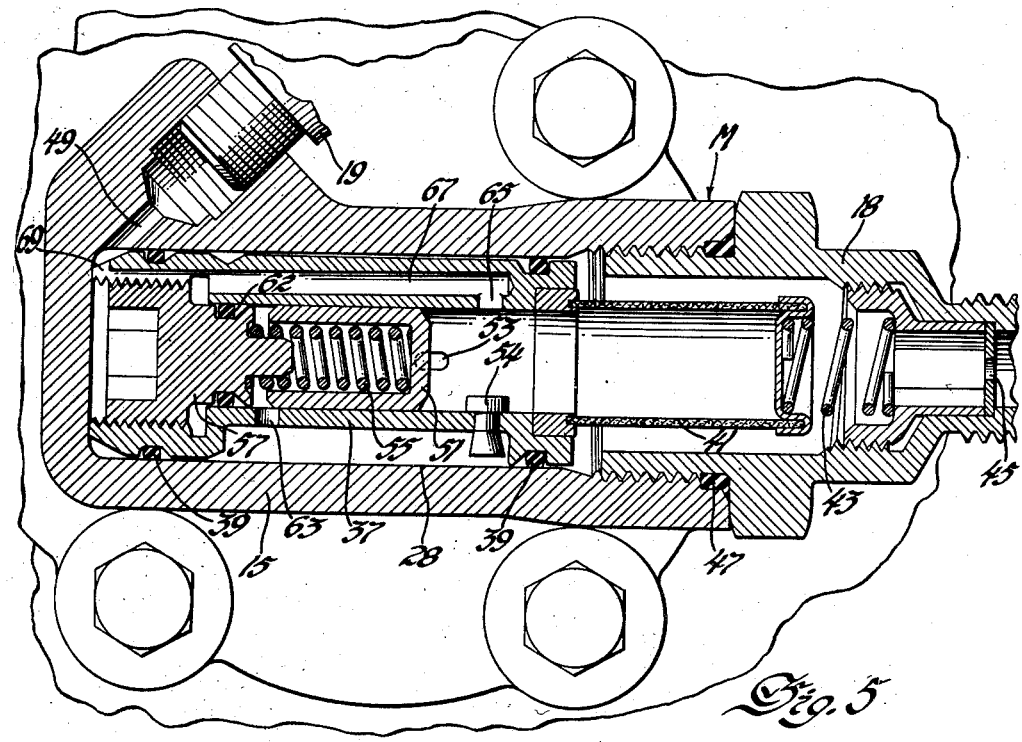
Figure 5 is an enlarged cross sectional view taken on line 5—5 of Figure 1 with parts broken away.

The internal details of the master valve M are best shown in Figure 5. A valve sleeve 37 is shown in sealed relation with the inner end of the housing bore 28 by means of sealing rings 39 placed between the ends of the sleeve and the housing bore 28 and the inner end of the sleeve is held in contact with the inner end of the bore 28 by means of a filter element 41 and spring 43 placed between the outer end of the sleeve and a calibrated orifice member 45 threaded in the inner end of the fuel manifold pipe connection 18 which is threaded into the outer end of the housing bore 28 and sealed by a gasket 47. The pipe connection 19 for the equalizing manifold 21 is threaded in passage 49 in the housing 15 opening into the inner end of the housing bore 28. A piston valve 51 is slidable in the sleeve 37 and is adapted to cooperate with a formed port 53 extending radially through the sleeve intermediate the ends thereof and also opening into the valve housing bore 28 to vary the area of the port depending upon the pressure on opposite sides of the piston. The valve piston 51 is normally urged toward the outer end of the sleeve into contact with a rivet 54 in a radial hole through the sleeve to serve as a limit stop by means of a spring 55 placed between the piston and an adjusting screw 57 threaded in the inner end of the sleeve 37. A sealing ring 62 is placed between the internal surface of the valve sleeve 37 and an external groove of the adjusting screw 57 and the space between the screw 57 and piston 51 is placed in communication with the bore 28 of the valve housing 15 by means of a port 63 in the valve sleeve 37. The space ahead of the piston in communication with the fuel manifold 11 through the filter element 41, calibrated orifice member 45, pipe connection 18 and manifold outlet pipe 12 is placed in communication with the opening 49 connected by the pipe connection 19 and pipe 20 leading to the equalizing manifold 21 in the following manner. A hole 65 in the sleeve directly opposite the rivet opens into a longitudinal passage 67 in the sleeve which communicates with the opening 49 through a radial slot 69 in the externally tapered inner end portion of the sleeve 37.

Figure 4:
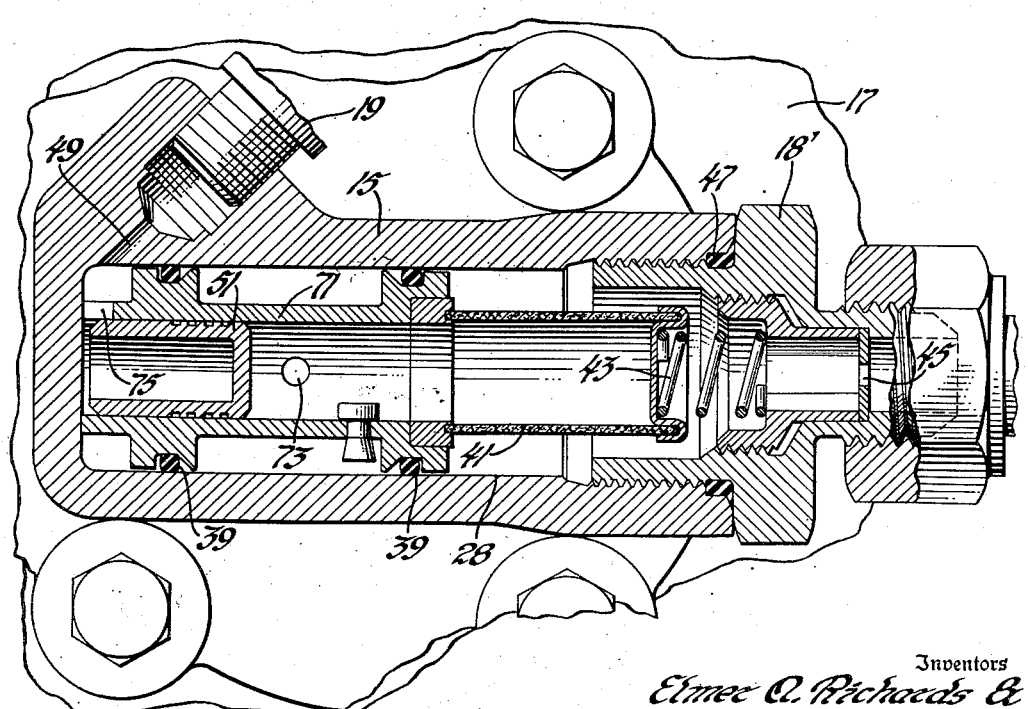
Figure 4 is an enlarged cross sectional view taken on line 4—4 of Figure 3 with parts broken away.

The internal details of each of the other slave equalization valves are best shown in Figure 4. A valve sleeve 71 is shown in sealed relation with the housing bore 28 by means of sealing rings 39 placed between the ends of the sleeve and housing bore. The inner end of the sleeve is also held in contact with the inner end of the bore by means of a filter element 41, and spring 43 placed between a calibrated orifice member 45 identical to that of the master valve M threaded in the inner end of a pipe connection 18' threaded into the outer end of the housing bore 28 and sealed by a gasket 47. A piston valve 51 is slidable in the sleeve 71 and is adapted to cooperate with a port 73 extending radially through the sleeve and communicating with the bore of the housing 15 to vary the area of the port depending upon the pressure on opposite sides of the piston and thereby vary the amount of fuel through the housing discharge passage 25 and spray tip 27 communicating with the housing bore 28. The housing passage 49 communicating with the equalizing manifold 21 is in communication with the space behind the piston 51 through a radial slot 75 in the inner end portion of the sleeve 71.

With the above described system fuel under pressure from the fuel pump 1 passes through the filter 5, manual control valve 7 when opened, and through pipe connections 8 and 9 to the fuel pressure manifold 11. From the manifold 11 pressure is applied through the manifold outlet pipes 12, the pipe connections 18—18' and the calibrated orifice members 45 and filter elements 41 in the valve housings 15 to the spaces in the valve sleeves 37— 71 ahead of the valve pistons 51. From the space ahead of the spring loaded piston 51 of the master valve M fuel pressure is applied through the hole 65, passage 67 and slot 69 in the sleeve 37 to the hole 49 in the master valve housing and through pipe connection 19 in this hole and branch pipe 20 to the pressure equalizing manifold 21. From the equalizing manifold 21 equalizing pressure is applied to the spaces in back of the pistons 51 in the slave valve sleeves 71 through the other branch pipes 20. The pressure ahead of the master valve piston causes it to move and vary the area of the sleeve port 53 until the pressure ahead of the master valve piston and behind the master valve orifice is equal to the total pressure behind the master valve piston. This total pressure is equal to the pressure of the spring 55 and the back pressure in the nozzle discharge passage 25 which communicates with the space around the master valve sleeve 37 which is provided with the port 63 opening into the space in back of the master valve piston. The spring adjusting screw 57 serves to vary the force extended by the spring 55 on the back of the master valve piston. The total force in back of the master valve piston accordingly balances the pressure in the space ahead of this piston and as this space is connected to the spaces in back of the slave valve pistons these pistons will move to adjust the area of the ports of the slave valves so that the pressure ahead of the slave valve pistons and behind the orifices therein is equal to the pressure ahead of the master valve piston and behind the orifice therein.

If the matched area orifices 45 are located at the same level and connected to the pressure inlet manifold 11, as shown schematically in Figure 7, the pressure ahead of each of the orifices is the same and as the pressure behind the orifices is maintained the same by the above described action of the master and slave valves and the connections therebetween which are also shown schematically in Figure 7 it will be apparent that the pressure drop or differential across the matched area orifices is the same and equal flow of fuel will accordingly take place through each orifice 45, each valve port and each nozzle discharge passage to each combustion chamber 13.

With the combustion chamber 13, nozzles 23 and valves located in a circle in a vertical plane and directly interconnected between the concentrically arranged circular fuel pressure and equalizing manifolds 11—21 the pressure ahead of the matched area orifices in the valves are unequal by reason of the increasing head pressures of the fuel in the fuel pressure manifold. The same variation in pressures behind the orifices will apply however as the head pressures in the circular equalizing manifold is in concentric relation with the fuel pressure manifold and there will accordingly be the same pressure drop across each orifice and equal flow through the valve and nozzle discharge passages leading therefrom. As previously explained the master valve M is connected between the upper portions of the fuel pressure and equalizing manifolds and is subjected to minimum head pressure.

The manually operable throttle valve 7, shown in Figures 1 and 7, connected between the fuel pump 1 and pressure manifold 11 serves to vary the pressure ahead of the matched area orifices and thereby control the amount of fuel flow through the orifices and discharge connections leading therefrom.

In Figure 8 the manually operable throttle valve 7 and the spring 55 behind the master valve piston is dispensed with and a manually operable valve 7' is placed in the nozzle discharge passage 25 to vary the pressure in back of the master valve piston and therefore the pressure ahead of this piston and behind the slave valve pistons in order to vary the pressure equally behind the matched area orifices of the valves and accordingly vary the pressure drop across the orifices to control the flow equally through the separate valve discharge passages therefrom as the same connections as previously described are provided between the valves.

With the arrangement shown in Figure 8, if the valve 7' is moved to restrict the flow through the master valve discharge nozzle passage 25, the pressure behind and ahead of the master valve piston will increase and cause a corresponding increase in pressure behind and ahead of the slave valve pistons thereby reducing by an equal amount the pressure drop across and the flow through the orifices and separate discharge passages. If the valve 7' is moved to increase the flow through the master valve discharge passage the reverse action to that just described will take place. Identical operation to that just described is provided by dispensing with connection 65 and also the piston 51 of the master valve M shown in Figure 8, providing the master valve cylinder is the same diameter as that of the slave valve cylinders in order to maintain the head due to the velocity the same in the master valve cylinder as in the slave valve cylinders.

We claim:
1. In a fluid distribution system, a plurality of orifices supplied with fluid under pressure from a common source of pressure, a valve connected to the outlet side of each orifice, each valve including a housing having a discharge port and a movable wall therein subjected on one side to the pressure behind an orifice and cooperating with the discharge port to vary the area thereof, a pressure equalizing connection connecting the pressure side of the movable wall of one valve, serving as a master and the opposite sides of the movable walls of said other valves and means for applying a balancing pressure on the opposite side of the movable wall of the master valve.

2. In a fluid distribution system, a plurality of orifices supplied with fluid under pressure from a common source of pressure, a valve connected to the outlet side of each orifice, each valve including a housing having a discharge port, a discharge passage leading therefrom and a movable wall therein subjected on one side to the pressure behind an orifice and cooperating with the discharge port to vary the area thereof, a pressure equalizing connection connecting the pressure side of the movable wall in one valve, serving as a master, and the opposite sides of the movable walls of said other valves and means for applying different values of pressure on the opposite side of the movable wall of the master valve.

3. In a fluid distribution system, a plurality of orifices supplied with fluid under pressure from a common source of pressure, said orifices being of equal area, a valve connected to the outlet side of each orifice, each valve including a housing having a discharge port, a discharge passage leading therefrom, a movable wall therein subjected on one side to the pressure behind an orifice and cooperating with the discharge port to vary the area thereof, a pressure equalizing connection connecting the pressure side of the movable wall in one valve, serving as a master, and the opposite sides of the movable walls of said other valves and means for applying different values of pressure on the opposite side of the movable wall of the master valve to maintain the same pressure drop across each of said orifices and to thereby insure equal flow through each of said valve discharge passages.

4. In a fluid distribution system, a plurality of orifices supplied with fluid under pressure from a common source of pressure, said orifices being of equal area, a valve connected to the outlet side of each orifice, each valve including a housing having a discharge port, a discharge passage leading therefrom and a movable wall subjected on one side to the pressure behind an orifice and cooperating with the discharge port to vary the area thereof, a pressure equalizing connection connecting the pressure side of the movable wall in one valve, serving as a master, and the opposite sides of the movable walls of said other valves and means for applying different values of pressure on the opposite side of the movable wall of the master valve to maintain the same pressure drop across each of said orifices and thereby insure equal flow through each of said valve discharge passages, said means including a spring and spring adjusting means.

5. In a fluid distribution system, a plurality of orifices supplied with fluid under pressure from a common source of pressure, said orifices being of equal area, a valve connected to the outlet side of each orifice, each valve including a housing having a discharge port, a discharge passage leading therefrom and a movable wall subjected on one side to the pressure behind an orifice and cooperating with the discharge port to vary the area thereof, a pressure equalizing connection connecting the pressure side of the movable wall in one valve, serving as a master, and the opposite sides of the movable walls of said other valves and means for applying different values of pressure on the opposite side of the movable wall of the master valve to maintain the same pressure drop across each of said orifices to thereby cause equal flow through each of said valve discharge passages, said means including a spring and a fluid connection from the master valve discharge passage.

6. In a fluid distribution system, a plurality of orifices supplied with fluid under pressure from a common source of pressure, said orifices being of equal area, a valve connected to the outlet side of each orifice, each valve including a housing having a discharge port, a discharge passage leading therefrom and a movable wall subjected on one side to the pressure behind an orifice and cooperating with the discharge port to vary the area thereof, a pressure equalizing connection connecting the pressure side of the movable wall in one valve, serving as a master, and the opposite sides of the movable walls of said other valves and means for applying different values of pressure on the opposite side of the movable wall of the master valve to maintain the same pressure drop across each of said orifices and to thereby cause equal flow through each of said valve discharge passages, said means including a fluid connection from the master valve discharge passage and means for varying the pressure in said passage.

7. In a fluid distribution system, a plurality of orifices of the same area located at different levels and supplied from a common source of fluid pressure, a valve connected to the outlet side of each orifice, each valve including a housing having a discharge port, a movable wall therein subjected on one side to the pressure from an orifice for controlling the area of said port, and a fluid connection directly interconnecting said pressure side of the movable wall of one valve, serving as a master, and connected to the orifice located at the highest level, with the opposite sides of the movable walls in each of said other valves and means for subjecting the opposite face of the movable wall of the master valve to a variable controlling pressure to maintain equal pressure differences across and equal values of flow through the orifices and the valve ports.

8. In a fluid distribution system, a source of fluid pressure, a circular pressure delivery manifold inclined to the horizontal plane and provided with a plurality of branch outlets, a throttle valve between said source of said pressure and said pressure delivery manifold, a valve in each branch outlet, each valve including a housing having an inlet passage, an orifice in said passage, an outlet port and a wall therein subjected on one side to the pressure from said orifice and movable in response to the pressure on opposite sides thereof for varying the area of said port, a circular equalizing manifold in concentric relation with said pressure delivery manifold for directly interconnecting the pressure side of movable wall of said valve located at the highest level and serving as a master with the opposite sides of the movable walls of said other valves, and means comprising a spring, spring adjusting means and a pressure connection between the opposite side of the movable wall of the master valve and the outlet side of the port thereof for exerting a variable controlling pressure thereon.

9. In a fluid distribution system, a source of fluid pressure, a circular pressure delivery manifold inclined to the horizontal plane and provided with a plurality of branch outlets, a valve connected to each outlet, each valve having an inlet orifice, a discharge port, a discharge passage leading therefrom, and a wall therein subjected on one side to the pressure from an orifice and movable in response to differential pressure on opposite sides for controlling the area of the discharge port, said valve orifices being of the same dimensions, a circular pressure equalizing manifold in concentric relation with the pressure delivery manifold for directly interconnecting said pressure side of the movable wall of the valve located at the highest level and serving as a master to the opposite sides of the movable walls of said other valves, and means comprising a connection for subjecting the opposite side of the movable wall of the master valve to the pressure in the discharge passage thereof and manual means for varying the pressure in said discharge passage.

10. In a fluid distribution system, a source of fluid pressure, a circular delivery manifold inclined to a horizontal plane and provided with a plurality of branch outlets, a manual throttle valve connected between said source and said manifold, a valve in each branch outlet, each valve having a bore including an inlet orifice, a discharge port and discharge passage leading therefrom and a piston movable in said bore in response to the pressure differences on opposite sides thereof and cooperating with said port to vary the area thereof, a circular equalizing manifold in concentric relation with said pressure delivery manifold for directly interconnecting the inlet pressure side of the piston in the valve positioned at the highest level and serving as a master valve with the opposite sides of said other valve pistons, and means including a spring, spring adjusting means and a fluid connection from the outlet side of the master valve discharge port for applying balancing pressure on the opposite side of said master valve piston to maintain equal values of pressure differential across each of said orifices in order to obtain equal values of flow from each of said valve discharge passages.

11. In a fluid distribution system, a source of fluid pressure, a circular pressure delivery manifold inclined to the horizontal plane and having a plurality of branch outlets, a valve in each branch, each valve having a bore including an inlet orifice, a discharge port and passage leading therefrom and a piston movable in the bore in response to pressure differences on opposite sides thereof and cooperating with the port to vary the area thereof, a circular equalizing manifold in concentric relation with said pressure delivery manifold directly interconnecting the inlet pressure side of the piston in the valve positioned at the highest level and serving as a master valve and the opposite sides of said other valve pistons and means including a fluid connection from the outlet side of the master discharge port and a manually operable throttle valve in the discharge passage of said master valve for controlling the pressure on the opposite side of said master valve piston to maintain equal values of pressure differential across each of said valve orifices and equal values of flow from each of said valve discharge passages.

12. In a fluid distribution system, a source of fluid pressure, a circular pressure delivery manifold inclined to the horizontal plane and having a plurality of branch outlets, a valve in each branch, each valve having a bore including an inlet orifice, an outlet port and an outlet passage leading therefrom, one of said valves serving as a master and located in the branch outlet at the highest level and each of said other valves serving as slaves, a piston movable in the bore of each of said valves in response to pressure differences on opposite sides thereof and cooperating with the valve port to vary the area thereof, a circular equalizing manifold directly interconnecting the inlet side of the piston in the bore of the master valve and the bores of said slave valves on the side of the pistons opposite the inlet orifice and a manually operable throttle valve in the outlet passage of said master valve for controlling the pressure in said master valve bore and said equalizing manifold to maintain equal values of pressure differential across each of said valve inlet orifices and equal values of flow from each of said valve discharge passages.

13. Apparatus for distributing fluid from a common source to a plurality of discharge points, comprising a plurality of branch conduits, each leading from said source to one of said points, a metering restriction in each of said conduits, a valve in each of said conduits downstream from its associated restriction, a spring biasing the valve in one of said conduits toward closed position, said spring biased valve being subject to the pressure of the fluid in its associated conduit acting directly thereon in an opening direction, said spring and valve being effective to maintain said pressure substantially constant, operating means for each of the valves in the other of said conduits including, for each valve, a pair of expansible chambers separated by a movable wall, a connection between said wall and its associated valve, a fluid conduit connecting one of said chambers to its associated branch conduit on the downstream side of the restriction therein, and a fluid conduit connecting the other of said chambers to said one conduit on the downstream side of the restriction therein, so that said other valves maintain the pressure drops across their associated restrictions equal to the pressure drop across the restriction in said one conduit.

14. Apparatus for distributing fluid from a common source to a plurality of discharge points, comprising a plurality of branch conduits, each leading from said source to one of said points, a metering restriction in each of said conduits, a valve in each of said conduits downstream from its associated restriction, means for operating one of said valves to maintain a substantially constant pressure on the downstream side of its associated restriction, means for operating each of the others of said valves to maintain the pressures on the downstream sides of their associated restrictions equal to said substantially constant pressure.

15. In an automatic flow regulating system for fluids, a header or manifold adapted to receive the fluid to be regulated and having a plurality of flow passages branching therefrom and terminating at individual points of discharge, a regulating valve in each branch passage upstream of said points of discharge, a metering jet in each branch conduit upstream of each valve, a pressure responsive element operatively connected to each valve, means for communicating pressure downstream of said branch metering jets to one side of each of said elements, one of said branch passages functioning to communicate a common regulating pressure to the opposite side of each element and having a master or pilot metering jet therein, said pilot jet being of predetermined effective area relative to the branch jets to maintain the pressure on opposite sides of said elements at a given value or values and thereby cause said regulating valves to assume positions determined by the drop across said pilot jet and branch jets, any variation of the discharge pressure at any one or more of said points of discharge from the value as determined by the drop across its coacting branch jet and the pilot jet causing the coacting valves to move to positions which automatically correct the drop across the branch jet or jets and distribute the flow as predetermined by jet area to all points of discharge.

16. In an automatic flow regulating system for fluids, a header or manifold adapted to receive the fluid to be regulated and having a plurality of flow passages branching therefrom and terminating at individual points of discharge, a regulating valve upstream of each of said points of discharge, a metering jet in each of said branch conduits upstream of each valve, a pressure responsive element operatively connected to each valve, means for communicating downstream jet pressure to one side of each of said elements, the jet in one of said branch passages functioning as a pilot metering jet, means for communicating fluid pressure downstream of said pilot jet to the opposite sides of said elements, said jets including the pilot jet being of substantially equal effective area, unequal discharge pressure at any one or more of said points of discharge unbalancing the pressure across said elements and causing the coacting regulating valve to move to a position to correct the drop across its coacting branch metering jet and maintain flows equal to all points of discharge.

17. In an automatic flow regulating system for fluids, a header or manifold adapted to receive the fluid to be regulated and having a plurality of flow passages branching therefrom and terminating in discharge nozzles, a regulating valve in each of said branch passages upstream of said nozzles, a metering jet in each of said branch passages upstream of each valve, means providing a pilot pressure chamber and a branch pressure chamber including a movable element such as a diaphragm operatively connected to each valve and having its opposite sides exposed to the pressures in said chambers, a passage communicating pressure downstream of each of said branch jets to its coacting branch pressure chamber and such pressure acting in a direction tending to open its coacting valve, one of said branch passages functioning as a pilot passage and having a pilot jet therein, said pilot passage communicating downstream of said pilot jet with said pilot pressure chambers and producing a common pilot pressure acting in a direction tending to close said valves, said jets including the pilot jet being of substantially equal effective area, unequal discharge pressures at any one or more of said nozzles unbalancing the pressure across said elements, causing the regulating valves to automatically assume positions for equal distribution of fluid to all of said nozzles.

18. In an automatic flow regulating system for fluids, a header or manifold adapted to receive the fluid to be regulated and having a plurality of flow passages branching therefrom and terminating in discharge nozzles, a metering jet in each of said branch passages, means defining a pilot pressure chamber and a branch pressure chamber including a pressure responsive element constituting a movable wall between said chambers, a regulating valve operatively connected to each of said elements, a passage downstream of each of said branch metering jets for communicating downstream jet pressure to each of said branch chambers in a direction tending to open said valves, one of said branch passages constituting a pilot conduit and being in communication with said pilot chambers to communicate a common regulating pressure to said pilot chambers in a direction tending to close said valves, a pilot metering jet in said pilot conduit between said pilot chambers and said manifold, said pilot conduit functioning to supply fuel to a pilot discharge nozzle, valve means in said pilot conduit between the pilot jet and the pilot discharge nozzle for maintaining a predetermined pressure in the pilot conduit above pilot discharge nozzle pressure, said jets including said pilot metering jet being of substantially equal effective area, unequal discharge pressure at any one or more of said nozzles unbalancing the pressure across said elements and causing the regulating valves to move to positions in relation to the drop across said jets and correct for unequal distribution of flow to said nozzles.

19. In an automatic flow regulating system for liquid fuel wherein the fuel is conducted under pressure from a common source to a manifold and thence to a plurality of discharge nozzles, regulating valves upstream of said nozzles, a metering jet upstream of each valve, a pressure responsive element connected to each valve and subjected in a valve opening direction to the pressure of fuel downstream of the coacting metering jet, a pilot discharge nozzle, one of said jets constituting a pilot jet through which fuel flows to said pilot nozzle, a pilot conduit arranged to subject said elements in a valve closing direction to the pressure of fuel downstream of said pilot jet, one of said regulating valves functioning as a check valve between said pilot jet and said pilot nozzle for maintaining a predetermined pressure in said pilot conduit above pilot discharge nozzle pressure, said jets including the pilot jet being of substantially equal effective area, any disturbance in the normal operation of any one or more of the discharge nozzles momentarily producing a differential across said elements tending to move the regulating valves to positions which correct the drop across the coacting metering jet or jets and automatically distribute the flow equally among the entire group of nozzles.

References Cited in the file of this patent

UNITED STATES PATENTS

| | | |
|---|---|---|
| 1,272,212 | Callan | July 9, 1918 |
| 1,930,455 | Hannum | Oct. 10, 1933 |
| 1,999,834 | Ernst | Apr. 30, 1935 |
| 2,291,229 | Johnson | July 28, 1942 |
| 2,430,264 | Wiegand | Nov. 4, 1947 |
| 2,676,603 | Kollsman | Apr. 27, 1954 |

FOREIGN PATENTS

| | | |
|---|---|---|
| 480,086 | Germany | July 27, 1929 |
| 526,869 | Germany | 1931 |
| 577,132 | Great Britain | May 7, 1946 |